United States Patent [19]

Ridenour

[11] 4,330,144
[45] May 18, 1982

[54] TUBE FITTING ASSEMBLY WITH DEFORMABLE SEAL

[76] Inventor: Ralph G. Ridenour, 626 Lexington-Ontario Rd., Mansfield, Ohio 44903

[21] Appl. No.: 916,738

[22] Filed: Jun. 19, 1978

Related U.S. Application Data

[60] Continuation-in-part of Ser. No. 527,683, Nov. 27, 1974, Pat. No. 4,200,314, which is a division of Ser. No. 425,561, Nov. 17, 1973, abandoned.

[51] Int. Cl.³ .................................... F16L 13/14
[52] U.S. Cl. ............................. 285/382.5; 29/523
[58] Field of Search ............... 285/382.5, 382.4, 382, 285/382.1, 382.2

[56] References Cited

U.S. PATENT DOCUMENTS

| | | | |
|---|---|---|---|
| 1,533,886 | 4/1925 | Mueller et al. | 285/382.1 X |
| 1,644,154 | 10/1927 | Schriner | 285/382.4 X |
| 1,674,562 | 6/1928 | Mueller et al. | 285/382.4 X |
| 2,434,080 | 1/1948 | Rosa | 285/382.5 X |
| 2,450,581 | 10/1948 | Couty | 285/382.5 X |
| 2,477,676 | 8/1949 | Woodling | 285/382.5 X |
| 2,545,930 | 3/1951 | Richardson | 285/382.5 X |
| 2,685,461 | 8/1954 | Mueller | 285/382.5 X |
| 3,092,404 | 6/1963 | MacWilliam | 285/382 X |
| 3,208,136 | 9/1965 | Joslin | 285/382.5 X |
| 3,778,090 | 12/1973 | Tobin | 285/382.5 X |
| 3,787,945 | 1/1974 | Pasek et al. | 285/382.5 X |
| 3,817,562 | 6/1974 | Cook et al. | 285/382.5 X |
| 3,940,168 | 2/1976 | Balon | 285/382 X |
| 3,977,710 | 8/1976 | Ridenour | 285/382.5 |

FOREIGN PATENT DOCUMENTS

| | | | |
|---|---|---|---|
| 723849 | 12/1965 | Canada | 285/382.5 |
| 688579 | 3/1953 | United Kingdom | 285/382.5 |

*Primary Examiner*—Thomas F. Callaghan
*Attorney, Agent, or Firm*—Pearne, Gordon, Sessions, McCoy & Granger

[57] ABSTRACT

A tube fitting assembly is disclosed wherein a ductile metal tube is forced into first and second orifices within a fitting. The tube is closely received within the first orifice and the second orifice is larger so that the axial force on the tube axially contracts the tube to form a radially expanded bead on the tube substantially filling the second orifice. This establishes a fluid tight seal between the tube and the fitting and also retains the tube in the fitting. An annular deformable seal member is also provided between an outer surface of the tube and an inner surface of the fitting and this seal may be a rubber-like O-ring or a composition material which is more yieldable than the material of the tube and fitting, may be set up from a liquid or plastic sealant material, or may be a deformable wall of the fitting. The force used to axially contract and radially expand portions of the tube is also utilized to compress the deformable seal between an outer surface of the tube and an inner surface of the fitting to make doubly sure of a good fluid-tight seal. The tube fitting assembly is thus able to withstand higher pressures, suddenly applied pressures, corrosive fluids, and extreme and rapid changes in temperature, with only a negligible number of failures of the assemblies. The foregoing abstract is merely a resume of one general application, is not a complete discussion of all principles of operation or applications, and is not to be construed as a limitation on the scope of the claimed subject matter.

4 Claims, 14 Drawing Figures

TUBE FITTING ASSEMBLY WITH DEFORMABLE SEAL

CROSS REFERENCE TO RELATED APPLICATIONS

This application is a continuation-in-part of my prior application Ser. No. 527,683, filed Nov. 27, 1974, now U.S. Pat. No. 4,200,314, which is a division of my prior application Ser. No. 425,561, filed Nov. 17, 1973, now abandoned.

BACKGROUND OF THE INVENTION

Tube fitting assemblies have been made in many different varieties and for many different uses. When corrosive fluids are to be conveyed by the tube and where high pressures are to be utilized, the prior art has generally used rather expensive tube fitting assemblies, constructed of expensive materials and with rather complex structures taking considerable time to manufacture the fitting as well as to assemble it.

One example of an adverse environment is the use of air conditioning assemblies in automobiles. The refrigerant used in the air conditioning units is rather corrosive and over a period of time has seemed to attack almost all packing or sealing material in the tube fitting assemblies, thus eventually causing leaks. Additionally the temperature range within the engine compartment of a modern automobile is as much as 200 degrees, from below zero degrees Fahrenheit to near 200 degrees Fahrenheit. Still further there is considerable vibration both from the engine and from road shocks. The combination of these factors has caused the use in automotive air conditioners of tube fitting assemblies which are rather expensive to manufacture and to assemble, in man hours of labor. Additionally there are millions of such automotive air conditioners made each year with many joints to be made for each air conditioner, and thus the industry is quite anxious to obtain a tube fitting assembly which is not only economical to use and manufacture, but also reliable so that expensive warranty work is not needed. Retrofitting a defective joint in an existing automobile out in the field is far more expensive than the total cost of all fittings on the entire automotive air conditioner in the first instance. Hence such industry is not interested in a cheap fitting which does not hold up under the severe conditions encountered.

The industry would also like to use aluminum tubing because it is light weight yet strong, but aluminum has traditionally been a difficult metal to join with another structure, one reason being that it is initially ductile but becomes rapidly work hardened and another reason is that the aluminum is subject to corrosion in the form of aluminum oxide which is a powdery yet an insulating material.

The prior art has known tube fittings with a flange or an annular bead, including those fittings where such bead acted against a resilient packing member. However, most of these were with reusable fittings of the two piece type such as an interthreaded nut and fitting connection. These are expensive to manufacture and time consuming to assemble. Where it is not necessary to be able to disassemble the fitting and reuse it, the prior art has known fittings which are assembled by an internal mandrel expanding the tube against a wall of the fitting. In this case the outwardly swaged tube is moved into engagement with a previously prepared aperture in the fitting which aperture takes several steps to prepare its shape properly to receive the tube. Then a further three or four step process is required to use a mandrel and die to outwardly swage the tube and finish the process of connecting the tube to the fitting. Accordingly the problem to be solved is how to construct a tube and fitting assembly and the method of assembling the same so as to overcome the economic and practical disadvantages of the prior art.

SUMMARY OF THE INVENTION

The problem is solved by utilizing a tube fitting assembly comprising in combination: a fitting having a first wall defining a first orifice through at least a portion of said fitting, said fitting having a second wall defining a second orifice substantially coaxial with and extending along at least a portion of said first orifice, said second orifice having a greater cross-sectional area than said first orifice, a tube having an inner and an outer tube wall with a first portion of said outer tube wall having an outer cross-sectional area substantially equal to said first orifice and being disposed in said first orifice, retention means longitudinally retaining said tube within said fitting and including a second portion of said tube longitudinally compressed to have two annular parts of said inner tube wall in mutual engagement to establish a radially expanded bead portion of the outer tube wall acting against and being radially restrained by said second wall of said fitting, and an annular deformable seal member in sealing engagement between an outer surface of said tube and an inner surface of said fitting.

An object of the invention is to provide a tube fitting assembly which is economical both to manufacture and to assemble and yet will seal high fluid pressures.

Another object of the invention is to provide a tube fitting assembly which may be used with many different materials and with various tolerances on the structural parts yet which will seal high fluid pressures.

Another object of the invention is to provide a tube fitting assembly which will maintain its sealing integrity despite wide variations in temperature, vibration and pressure.

Another object of the invention is to provide a method of assembly of a tube fitting wherein the tube and fitting may be assembled in an extremely simple manner yet the assembly will seal high fluid pressures.

Other objects and fuller understanding of the invention may be had by referring to the following description and claims, taken in conjunction with the accompanying drawing.

DESCRIPTION OF THE PREFERRED EMBODIMENTS

The invention is directed to a tube fitting assembly where a tube and fitting are joined so that they are capable of sealing high pressures and withstanding considerable mechanical shock and temperature shock. The tube is very simply prepared, the preparation consisting merely of providing a generally squared end on the tube. The fitting is also easily prepared using a stepped drill to form first and second orifices with the second orifice generally being a counterbore. Where quite high pressures are desired to be sealed an O-ring groove may be formed in the fitting requiring an additional step to form such a groove. Next a deformable annular seal member is placed in the fitting or on the tube, adjacent a longitudinal shoulder in the fitting, the fitting and the tube are individually held and then moved together axially along the tube axis. This forces the tube into the fitting and after the end of the tube strikes a shoulder the tube is longitudinally contracted to form one or more annular beads on the tube which are radially expanded. These beads are expanded outwardly into enlarged orifices and the longitudinal contraction of the tube is continued until two annular parts of the inner tube wall are compressed into mutual engagement. This establishes at this area of the tube the radially expanded bead portion which acts against the enlarged second orifice of the fitting. The fitting radially restrains this enlarged annular bead and acts as the means to retain the tube longitudinally within the fitting. Where the bead is trapped within a groove, this adds further to the longitudinal retention of the tube in the fitting despite high pressures.

The annular deformable seal member initially may be a solid member, a solid yet compressible material, a liquid or plastic thermosetting material, or any gasketing material, such as an O-ring or Teflon washer. It is forced into sealing engagement between an outer surface of the tube and an inner surface of the fitting. The seal member is compressed so that a fluid tight seal remains despite minute changes in the position of the tube relative to the fitting due to temperature changes, mechanical shock or vibration, pressure or other changes.

Figure 1:
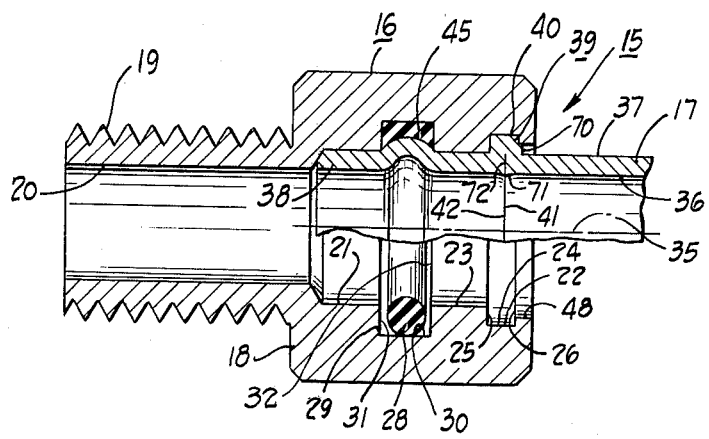
FIG. 1 is a longitudinal sectional view of a tube fitting with the lower part showing only the tube fitting and the upper part showing the fitting after assembly with the tube.

In FIG. 1, an assembly 15 includes a fitting 16 and a tube 17. The fitting may be of various kinds and one is shown having a body 18 and a mole thread 19 for connection to a utilization device. The fitting 16 has an aperture 20 to convey the fluid of the assembly 15, and has first and second walls 21 and 22 defining first and second orifices 23 and 24, respectively. The first orifice 23 extends through at least a portion of the fitting 16 and communicates with the aperture 20. The second orifice 24 has a greater cross-sectional area than the first orifice 23 and extends along a portion of the first orifice 23. In the embodiment shown in FIG. 1 this second orifice is coaxial with orifice 23, and is formed by the second wall 22 which is generally cylindrical, by an outwardly facing shoulder 25 and by an inwardly facing shoulder 26.

An annular deformable seal member 28 is provided in the fitting 16, and it may be a resilient or semi-solid seal member set up from a settable liquid or plastic sealant. Sealants suitable are thermosetting materials such as epoxy cements, and anerobic materials which set in the absence of air. In this embodiment of FIG. 1 this seal member is a resilient O-ring contained in an O-ring groove 29 having a generally cylindrical wall 30 and outwardly and inwardly facing shoulders 31 and 32, respectively.

The tube 17 has an axis 35 generally coaxial with the axis of the fitting 16. The tube also has an inner and outer tube wall 36 and 37, respectively. Initially the tube 17 has an outside diameter of the outer wall 37 which is slightly less than the diameter of the first orifice 23 so that the tube will readily slide longitudinally into this first orifice 23.

As assembled, the complete assembly 15 includes retention means 39 to longitudinally retain the tube 17 within the fitting 16. A first portion 38 of the tube 17 is positioned within the first orifice 23. A second portion 40 of the tube is longitudinally compressed to have two annular parts 41 and 42 of the inner tube wall 36 in mutual engagement. These are established by longitudinal compression of the tube 17 and establish a radially expanded bead which is the second portion 40 of the tube 17. This radially expanded bead acts against and is radially restrained by the second wall 22 of the fitting 16. It need not bear directly against this second wall 22, so long as the radial outward force of the bead 40 is restrained by a concomitant radial inward force from the second wall 22. This makes a tight engagement between the bead 40 and the second wall 22 which acts as a part of the retention means 39.

The longitudinal compression of the tube 17 also forms a second annular bead 45 which expands radially outwardly to radially compress the annular resilient seal member 28. Where the seal member is formed from a settable liquid or plastic, the material may be applied to the outer surface of the tube and then be forced by radial expansion of the tube end to be disposed primarily in the groove 29. This seal member may be an O-ring for example of fluorocarbon, polyacrylate, or butyl material, as examples. The considerable radially outward force developed by the second annular bead 45 considerably distorts the seal member or O-ring 28 into a generally rectangular cross section, except for perhaps some small fillets at the corners.

Figure 10:
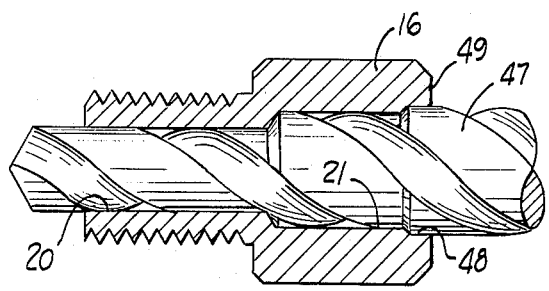
FIGS. 10–13 are longitudinal sectional views showing a sequence of steps in the method of assembly of the tube fitting assembly of FIG. 1.
Figure 11:
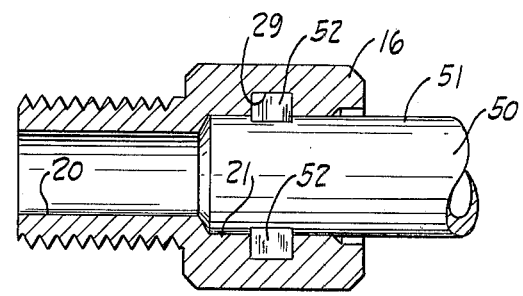

FIGS. 10–14 show the sequence of events of producing the tube fitting assembly 15. The fitting 16 is shown in FIG. 10 wherein a stepped drill 47 has first, second and third dimensions to drill the first aperture 20, the first wall 21 and a third wall 48 next to an outside surface 49 of the fitting 16. Next FIG. 11 shows the use of an O-ring grooving tool. This tool 50 has a shank 51 which is closely received within the first wall 21 and has one or more radially outwardly movable cutting tools 52 to move outwardly to cut the O-ring groove 29. The mechanism by which these tools are moved outwardly is not shown but such tools are commercially available.

Figure 12:
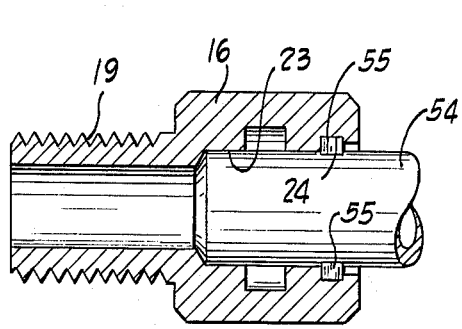
Figure 13:
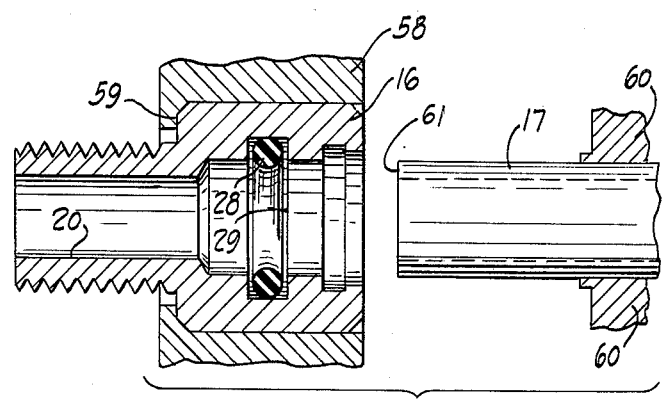

FIG. 12 shows the use of another such O-ring grooving tool 54 which enters the first orifice 23 and has cutting tools 55 at a different axial depth from the end to cut the second orifice 24. These steps will prepare the fitting 16 except for whatever secondary operations are required such as preparing the threads 19, as required. Next the fitting 16 is held in some suitable form of fitting holder 58, shown in FIG. 13. This may be a two part vise or it may be a one piece fixture as shown having a longitudinal shoulder 59 to resist longitudinal force. The tube 17 is held in a tube holder 60 and this is usually some form of a two piece vise or clamp having semicylindrical recesses to securely grip the tube to move it longitudinally forwardly relative to the fitting 16. The fitting 16 of FIG. 13 is shown with the O-ring 28 in place in the O-ring groove 29.

The end of the tube 17 extends beyond the tube holder 60 by a predetermined amount which amount is determined mostly by trial and error. After the correct amount is established then in production the amount of this tube extension beyond the tube holder 60 is usually provided quickly and easily by a fixture or gauge assembly.

Figure 14:
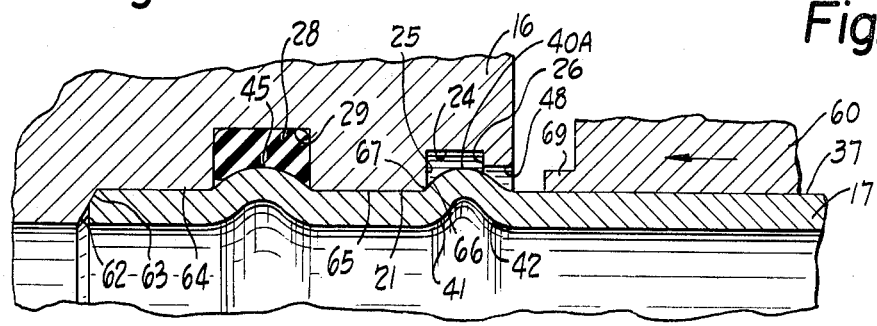
FIG. 14 is an enlarged longitudinal sectional view during the process of forming the assembly showing the tube partly deformed.

The FIG. 14 shows an enlarged view of the tube 17 partially longitudinally compressed into the fitting 16. The initially squared end 61 of the tube 17 has moved in until it has struck the conical shoulder 62 between the aperture 20 and the first wall 21. The continued application of longitudinal force has deformed a part 63 of the end of the tube 17 so that it is also conical by cold working of the end of the tube. The continued longitudinal contraction of the tube 17 enlarges it slightly at 64 and 65 to fit tightly against the first wall 21 which forms the first orifice 23. This squeezes out most of the liquid sealant, if such is used. The continued longitudinal contraction of the tube 17 causes it to bulge radially outwardly at two different places, the annular bead 45 and a partially formed annular bead 40A. The longitudinal contraction of the tube 17 forces the metal to cold work and to flow generally radially outwardly. Where the outer tube wall 37 is physically restrained as at the first wall 21, the expansion of the wall as at 64 and 65 continues until it is restrained by this wall. This may be an expansion of only a few thousandths of an inch, depending upon the initial tolerance in the slip fit between the parts. Where the outer tube wall 37 is not restrained, as at the O-ring groove 29 and at the second orifice 24, then the radially outward annular bead 45 or 40A is formed.

The radial extent of the second annular bead 45 is subject to many different factors, including diameter of the tube relative to the tube wall thickness, ductility of the metal of the tube, relative compressibility of the O-ring 28 or trapped liquid sealant, and perhaps most importantly the formation of the shoulder 66 at the annular bead 40A. When this shoulder 66 digs into the exterior corner 67, formed by the junction of the first wall 21 and the shoulder 25, then this is probably most effective in preventing further longitudinal movement to the left as viewed in FIG. 14 of that forward end of the tubing 17. Thus this tends to limit the amount of outward bulging of the second annular bead 45. The O-ring 28 may have different durometers which will also help determine how much this O-ring will be deformed to fill the generally rectangular O-ring groove 29. It may completely fill all corners or there may be small air space fillets remaining in the corners. Regardless, there is a good seal established between the second annular bead 45 and the O-ring or annular seal member 28.

Upon continued longitudinal contraction of the tube 17, then primarily only the second annular bead 40A compresses to form the bead 40 as shown in FIG. 1. This longitudinal contraction continues from the position of FIG. 14 to the position of FIG. 1 until the first part 41 and the second part 42 of the inner tube wall 36 are in tight engagement with each other. The tube holder 60 in this preferred embodiment has an annular cylindrical extension 69 which has a small enough outer diameter to just enter the third wall 48. This cylindrical extension 69 acts to securely pack the annular bead 40 into the second orifice 24. The outer end of the extension 69 forms an outer wall 70 on the second annular bead 40, as viewed in FIG. 1. Depending upon the precise position at which the tube holder 60 grips the tube 17, this outer wall 70 may be flush with the inwardly facing shoulder 26, it may be slightly outwardly of it as shown in FIG. 1, or could even be slightly inwardly of it. The important function of the extension 69 is that the metal of the tube wall is cold worked to be securely packed inside the second orifice 24 so that it acts radially outwardly against the second wall 22, and is radially restrained by such second wall. This may be a metal-to-metal seal engagement as in my prior application Ser. No. 527,683, or may have liquid sealant therebetween if such sealant has previously been applied to the tube or fitting in order to form the annular seal member 28. This radial restraint by the second wall is the retention means 39 which retains the tube 17 in the fitting 16. In the embodiment of FIG. 1 this retention means is greatly aided by the inwardly facing shoulder 26 which securely locks the annular bead 40 within this fitting 16.

As the extension 69 rams the material of the annular bead 40 within the second orifice 24, if there is a slight excess of material, then this sometimes causes the inside diameter of the tube 17 to be slightly restricted or bulged inwardly as at 71, although this is normally only a few thousandths of an inch and also normally occurs only with the smaller tubing diameters such as one-eighth and three-sixteenths inch OD sizes. Further the junction line 72, shown in FIG. 1, between the first and second engaging parts 41 and 42, may or may not be visible. In cutting into two longitudinal half sections a complete tube and fitting assembly 15, if the tube 17 is clean and uncorroded, usually this junction line 72 is not visible. It would be visible if the tube had first been painted black on the inside, if the inner tube wall is corroded, or if the assembly 15 is etched with acid after sectioning. However, usually with the unaided eye such junction line 72 is not visible.

The preferred dimensions of the various apertures in the fitting 16 depend upon the specific use, type of material of tube and fitting, tube diameter and tube wall thickness. The first wall 21 has a bore diameter just a few thousandths larger than the outside diameter 37 of the tube 17. Industry standards permit 0.004 inches tolerance in the outer diameter of the tube, so usually the diameter of the bore wall 21 is 4 to 6 thousandths larger than the tube diameter. The diameter of the second wall 22 has a theoretical size of the outside diameter of the tube plus twice the tube wall thickness. The axial length of this groove or second wall 22 is about one and one-half times the tube wall thickness. The axial depth of the first wall 21 plus second wall 22, namely, how far the tube is inserted into the fitting 16, is a minimum of the tube outside diameter plus twice the tube wall thickness. Inserting the tube 17 further into the fitting 16 by a deeper bore generally produces a stronger tube fitting assembly. The diameter of the orifice 20 is most anything suitable to carry the fluid flow but the maximum is about the inside diameter of the tube 17 in order to prevent extrusion of the tube 17 into this orfice 20.

The fitting has been successfully used on copper, steel and aluminum tube and fitting materials. The following table A shows typical dimensions which have been used satisfactorily for aluminum tubing used in aluminum fittings.

TABLE A

| Tube O.D. | .125" | .188" | .250" | .375" |
|---|---|---|---|---|
| I.D. of orifice 23 | .127/.131 | .187/.191 | .252/.256 | .377/.381 |
| I.D. of orifice 24 | .173 | .250 | .313 | .500 |
| axial length of 24 | .035 | .050 | .050 | .050 |
| axial length of 23 + 24 | .198 | .200 | .334 | .325 |
| I.D. of orifice 20 | .094 | .062 | .125 | .230 |

Figure 2:
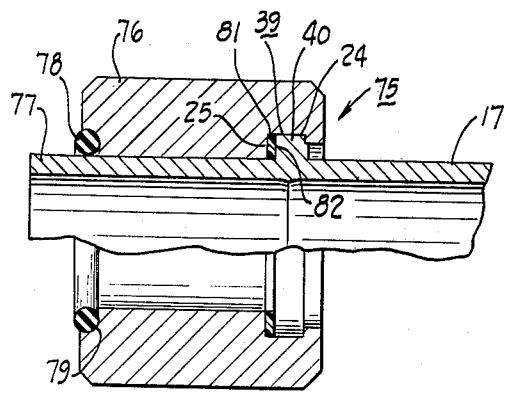
FIGS. 2 through 9 are longitudinal sectional views similar to FIG. 1 but showing additional modifications of the invention.

FIG. 2 shows a further tube and fitting assembly 75 according to a further embodiment of the invention. This assembly 75 includes a fitting 76 which is different from fitting 16 of FIG. 1 and illustrates the many different forms of fittings with which the invention may be used. The fitting 76 may be an example of something like a manifold block into which many different tubes 17 are assembled, and extend completely through such fitting 76 to leave an exposed end 77 of the tube 77. Some utilization device is connected to the exposed end 77 and sealed thereto by a second O-ring 78 disposed in a counterbore 79. The retention means 39 is essentially the same as in FIG. 1 and includes the annular bead 40 acting against and being radially restrained by the wall of the second orifice 24. An annular seal member 81 is used and is disposed between an outer surface of the tube 17 and an inner surface of the fitting 76. This annular seal member 81 is not circular in cross section initially, as is the O-ring 28, it is preferably a flat washer shaped member. Teflon is one suitable substance for this annular seal member 81. Teflon is not as resilient as butyl, fluorocarbon, or polyacrylate, the suggested materials for the O-ring, but is more resilient or deformable than the metal of the fitting 76 and tube 17.

In the formation of the tube fitting assembly 75 of FIG. 2, the end of the tube 77 needs to be held as well as the fitting 76, in order to have a force resisting the inward movement of the tube 17 by the tube holder 60. Since there is no shoulder in the fitting 76 to resist this force, this is supplied by some external anvil, for example. This might be a part of the fitting holder 58 of FIG. 13, as an example. The tube 17 is longitudinally compressed as before to form the annular bead 40 and this longitudinally compresses the annular seal member 81 between the shoulder 25 of the second orifice 24 and an inwardly facing shoulder wall 82 on the annular bead 40. The axial depth of the second orifice 24 may be increased slightly to accommodate the axial thickness of the annular seal member 81.

Figure 3:
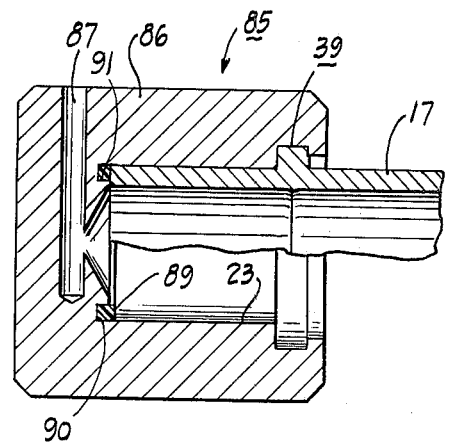

FIG. 3 is a longitudinal sectional view of another tube fitting assembly 85 constructed in accordance with the invention. This assembly includes a fitting 86 which has an orifice 87 communicating with the first orifice 23. In this embodiment the orifice 87 is not coaxial with the orifice 23 as in FIGS. 1 and 2 but is transverse thereto to illustrate the flexibility of applications of the invention. The retention means 39 may be the same as in FIG. 1. An annular deformable seal member 89 is disposed in an axial recess between a flat shoulder 90 at the inner end of the bore forming the first orifice 23 and the flat end of the tube 17. A radial shoulder 91 also defines part of the axial recess and helps contain the seal member 89, especially if it is formed from a settable liquid sealant.

The constructions of FIGS. 2 and 3 are slightly simpler than that of FIG. 1 because the O-ring groove 29 is omitted hence the step of FIG. 11 may be omitted. All of the embodiments of FIGS. 1, 2 and 3 have the inwardly facing shoulder 26 which may be formed in a variety of ways, for example by a threading operation, but as shown is formed by the O-ring grooving tool 54.

Figure 4:
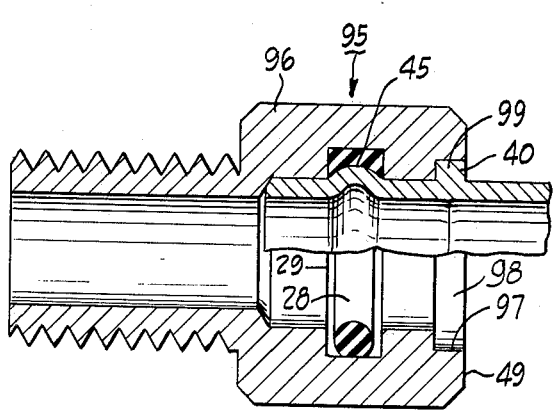

FIG. 4 shows another tube fitting assembly 95. This assembly shows a fitting 96 which is similar to the fitting 16 of FIG. 1 in that it has the male threads 19 and the O-ring groove 29 with the O-ring 28. One difference however is that the second orifice 97 has the second wall 98 thereof extending completely to the outside surface 49 of the fitting 96.

The retention means 99 is quite similar to the retention means 39 of FIG. 1 except that it does not rely upon any inwardly facing shoulder on the fitting 96. This retention means relies on the radially outward force of the annular bead 40 acting against and being restrained by the cylindrical wall 98 of the second orifice 97.

Figure 5:
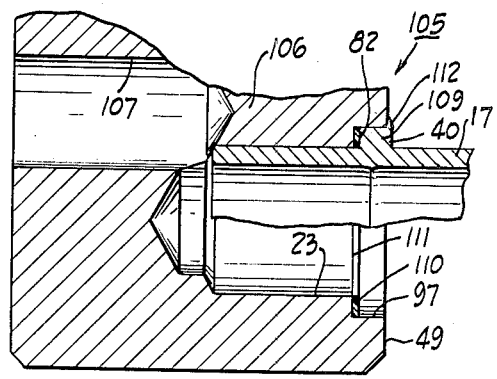

FIG. 5 shows an additional modification of the invention with an assembly 105 employing a fitting 106. Only part of this fitting 106 is shown and it has an orifice 107 communicating with the first orifice 23 into which the tube 17 is received. Retention means 109 is disposed in the second orifice 97 as in FIG. 4 which orifice extends to the outside surface 49 of the fitting. An annular seal member 110 in the form of a deformable flat washer is provided. After longitudinal compression of the tube 17, this annular seal member makes sealing engagement between the outwardly facing shoulder 111, which forms part of the second orifice 97, and the inwardly facing shoulder 82 on the annular bead 40 which forms a part of the retention means 109. As shown in FIG. 5 there may or may not be a slight exterior flash 112 on the annular bead 40 overlying the outer surface 49 of any of the fittings in the drawing, such as the fitting 106. This exterior flash may be caused if there is a slight excess of material being longitudinally compressed to form this annular bead 40. The presence of such annular flash is not harmful, and its presence merely serves to signify that the cavity or second orifice has been completely filled by the annular bead 40.

Figure 6:
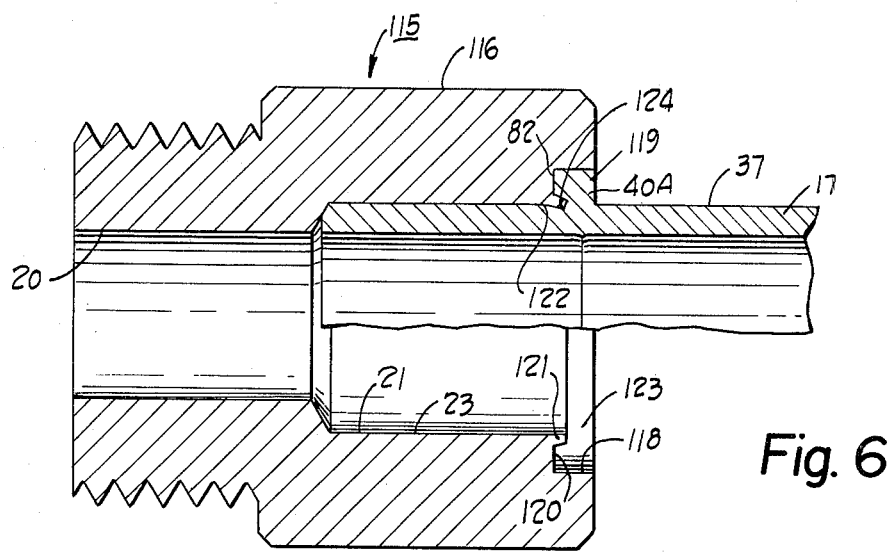

FIG. 6 shows another tube fitting assembly 115 which is shown with a fitting 116 having the aperture 20 communicating with the first orifice 23 which initially closely receives the tube 17.

The fitting 116 is prepared differently from that of FIG. 5 by using a special stepped drill which will form not only the first wall 21, but a third wall 118, an outwardly facing shoulder 120 and an extension wall 121 of the first wall 21 which extends into the second orifice 123. This extension wall, as formed, is cylindrical for easy formation with the first wall 21, and is about one-third the length of the second orifice 123. After the tube has been longitudinally forced into the first and second orifices 23 and 123, respectively, the annular bead 40A is formed as before by the folding together of annular inner portions of the tube wall. The large force established by this annular bead 40A acts radially outwardly as before to establish the retention means 119 by acting outwardly against the third wall 118. This longitudinal compression of the tube and formation of the annular bead 40A also causes it to exert a force inwardly on the extension wall 121. This force has a component of force which acts radially inwardly all the way around this annular extension wall 121 and forces it inwardly. In fittings made in accordance with this invention, the extension wall is deformed inwardly at about a 20 degree angle and the curve of deformation starts at a line 122 which lies inboard of the plane of the outwardly facing shoulder 120. This deformed extension wall then establishes a complementary groove 124 in the outer wall of the tube 17. The extension wall 121 thus bites into the tube outer wall to form not only a good metal-to-metal seal, but also acts as a part of the retention means 120 to longitudinally retain the tube 17 within the fitting 116. A liquid sealant may also be used with this construction of FIG. 6 in which case there may not be a metal-to-metal contact between the enlarged bead 40A and the third wall 118, the bead may be restrained by the third wall with the intermediary of the sealant acting as the annular resilient seal.

Figure 7:
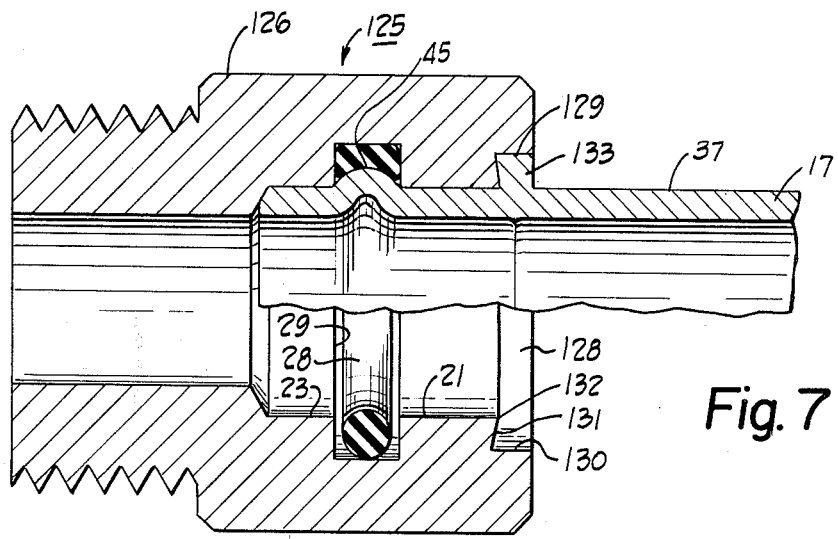

FIG. 7 shows a further tube fitting assembly 125 according to the invention which utilizes a fitting 126. This fitting is provided with the O-ring groove 29 and O-ring 28. Retention means 129 is provided in a second orifice 128. This orifice 128 is provided by a cylindrical wall 130 and a slightly conical wall 131 which establishes a sharp junction 132 where it joins the wall 21 of the first orifice 23. The annular bead 133 which fills this second orifice 128 is similar to the annular bead 40 except that the tube wall, in being folded double, has been forced to have a conical wall to conform to the conical wall 131. Additionally, an effective fluid tight seal is made at the line between the sharp junction 132 and the annular bead 133.

Figure 8:
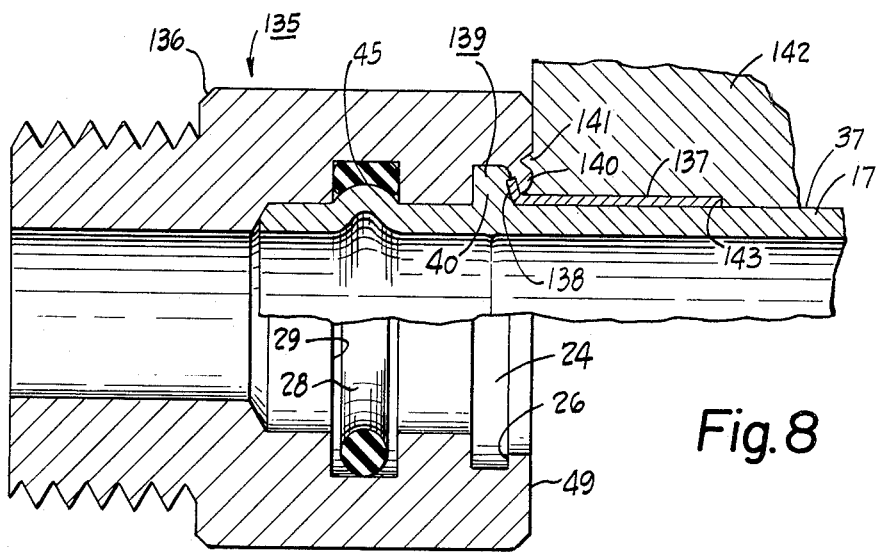

FIG. 8 shows another tube fitting assembly 135 which includes a fitting 136. This fitting has the O-ring groove 29 and the O-ring 28 and has a retention means 139 similar to that of FIG. 1 in that it includes the inwardly facing shoulder 26 of the second orifice 24. Additionally, this retention means 139 includes a reinforcing ferrule 137, for example, made of steel, which has a flange 138 engaging the annular bead 40. An inturned annular lip 140 is formed by cold working the fitting such as by staking. This inturned lip bears against the outer surface of the flange 138 to help retain it in place and at the same time help retain the entire tube 17 inside the fitting 136. The staking, as caused for example by an annular bead 141, may be performed as a separate staking operation, but preferably is formed at the same time as the conclusion of the forming of the assembly 135 by having this annular bead 141 on the front edge of the tube holder 142 to strike and deform the outer surface 49 of the fitting 136. The tube holder 142 may have a shoulder 143 to locate the ferrule 137.

Figure 9:
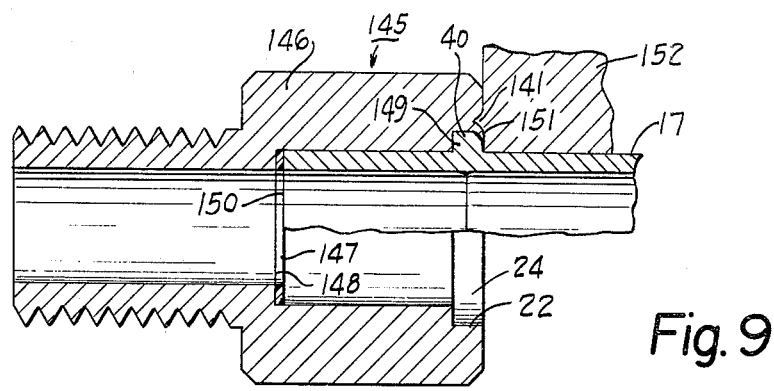

FIG. 9 shows another tube fitting assembly 145 incorporated in a fitting 146. In this case the O-ring is omitted and an annular deformable seal member 147 is provided, which may be a flat annular member, or one set up from a liquid sealant. This seal member 147 is disposed between a flat shoulder 148 and the squared end 150 of the tube 17. Retention means 149 utilizes the annular bead 40 which acts radially outwardly against the second wall 22 of the second orifice 24. A third wall 151 of this second orifice is formed later by cold working, for example, by staking. This third wall 151 is an inwardly facing shoulder and may be formed by the bead 141 on the tube holder 152. This inwardly facing wall 151, formed by staking, may also be used in the method of making the fitting 15 of FIG. 1 just subsequent to the drilling step of FIG. 10.

Each of the tube fitting assemblies disclosed provides a unique seal arrangement to assure a fluid-tight seal. The construction of FIG. 1, for example, has survived rigorous tests. The assembly will withstand 2000 psi fluid pressure and will also withstand vibration testing and severe temperature change tests. One such test passed by this tube fitting assembly is to have the tube and fitting assembly immersed in a liquid at $-359°$ F. and then suddenly plunged into heated oil at 212° F., then another 1000 cycles of vibration. As disclosed in my parent application Ser. No. 425,561 the annular bead 40 makes a good fluid tight seal with the inwardly facing wall of the fitting. The deformable annular seal provided by the settable liquid sealant, the O-ring 28, the various flat annular seal members, or the deformed extension wall 121, makes doubly sure that the fluid-tight seal will remain despite severe changes in temperature, pressure or vibration.

In refrigerant applications, for example, the refrigerant is rather corrosive, especially over a period of time and where high temperatures are encountered. This combination of corrosive fluid, high temperatures and vibrations is encountered in automotive air conditioning units, for example, and because of the great volume of these units being produced each year, it is desired to utilize an economical fitting. The present invention does disclose such a tube fitting assembly which is economical to manufacture and to assemble and yet one which assures an absolute minimum of leakage failures. Assembly line personnel often get bored with their jobs and may tend to get a little sloppy in performing their assigned tasks. The present tube fitting assembly is one which is quite forgiving and will accommodate a number of errors in or deviations from the preferred assembly method.

In my parent application the metal-to-metal seal provided by the annular radially expanded bead was often used to seal only about 2 psi in gas pilot light assembly for gas ranges. Such assemblies operating at 2 psi were tested at 100 psi and would readily meet this test. The present invention is designed to be used in more stringent applications, for example, where 2000 psi tests are required as well as vibration and severe temperature and pressure changes. In many cases it has been found that the refrigerant over a few years time gradually deteriorates any O-ring material. In such case if the fluid leaks past the resilient seal member, it will be stopped by and will not leak past the metal-to-metal seal provided at the annular bead 40.

Alternatively, suppose the vibration or pressure shock or temperature change breaks loose the metal-to-metal seal, or perhaps heat anneals the metal so that it relaxes slightly, in such case the resilient annular seal is still present to provide a fluid-tight seal. Also aluminum is an odd material. It is light yet strong so it is desired to be used in automotive air conditioning applications. However, in the past, it has often been considered difficult to properly join at a tube fitting assembly and welded joints were often used. In welding, for example, aluminum will just barely start to droop from the heat and then will suddenly melt and run. Thus it is difficult to properly weld. Also the aluminum, while it is a good conductor, often will acquire an aluminum oxide coating because of corrosion and this is a powdery material which is a good insulator. When the tube surface does become corroded and it is then tried to be made into a tube fitting assembly, problems of establishing a good fluid tight seal are compounded. The present invention provides improved results under such circumstances. The cold working and bending the metal into a U-shape to form the annular bead 40 breaks loose the aluminum oxide on the surface so that a good metal-to-metal seal is achieved at the second wall 22. Also high torsional strength is achieved from the cold working of the metal to form this annular bead 40. This high torsional strength is often needed where, at a long distance from the fitting, a torsional force is applied to the tube 17.

The combination of the metal-to-metal seal plus the annular deformable seal provides still another advantage. In the prior art form of joints if the joint were to fail then one could have a large squirting of liquid out of the failed fitting. In the present fitting if one of the two seals fails, for example, the metal-to-metal seal, then the O-ring or annular seal member will usually hold sufficiently so that there is only a slight seepage of liquid rather than a large squirting of liquid.

FIGS. 10–14 show the assembly method for the assembly of FIG. 1. The assembly method for FIGS. 2–9 are generally simpler than that of FIG. 1, so those skilled in the art will readily comprehend such methods from the above description and the drawing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A tube fitting assembly comprising, in combination:
   a fitting having a first wall defining a first orifice through at least a portion of said fitting;
   said fitting having a second wall defining a second orifice substantially coaxial with and extending along at least a portion of said first orifice;
   said second orifice having a greater cross-sectional area than said first orifice;
   a tube having an inner and an outer tube wall with a first portion of said outer tube wall having an outer cross-sectional area substantially equal to said first orifice and being disposed in said first orifice;
   retention means longitudinally retaining said tube within said fitting and including a second portion of said tube longitudinally compressed to have two annular parts of said inner tube wall in mutual engagement to establish a radially expanded bead portion of the outer tube wall acting against and being radially restrained by said second wall of said fitting;
   an annular deformable seal member separate from each of said tube and said fitting in sealing engagement between an outer surface of said tube and an inner surface of said fitting;
   said annular deformable seal member being an O-ring disposed in an annular groove in said fitting and engaging said outer wall of said tube, and
   said tube having a second radially expanded portion in engagement with said O-ring.

2. A tube fitting assembly as set forth in claim 1, wherein said retention means includes a third coaxial wall in said fitting defining a third orifice smaller in cross-sectional area than said second orifice and disposed between said second wall and an outer surface of the fitting.

3. A tube fitting assembly comprising, in combination:
   a fitting having a first wall defining a first orifice through at least a portion of said fitting;
   said fitting having a second wall defining a second orifice substantially coaxial with and extending along at least a portion of said first orifice;
   said second orifice having a greater cross-sectional area than said first orifice;
   a tube having an inner and an outer tube wall with a first portion of said outer tube wall having an outer cross-sectional area substantially equal to said first orifice and being disposed in said first orifice;
   retention means longitudinally retaining said tube within said fitting and including a second portion of said tube longitudinally compressed to have two annular parts of said inner tube wall in mutual engagement to establish a radially expanded bead portion of the outer tube wall acting against and being radially restrained by said second wall of said fitting;
   an annular deformable seal member separate from each of said tube and said fitting in sealing engagement between an outer surface of said tube and an inner surface of said fitting; and
   said retention means including a third wall in said fitting defining a third orifice smaller in cross-sectional area than said second orifice and disposed between said second wall and an outer surface of the fitting.

4. A tube fitting assembly as set forth in claim 3, wherein said retention means includes an inwardly facing shoulder between said second and third walls and engaging an outer surface on said tube.

* * * * *